June 2, 1959     A. STARTS     2,888,838
POWER TRANSMITTING APPARATUS
Original Filed Jan. 4, 1951     3 Sheets-Sheet 3
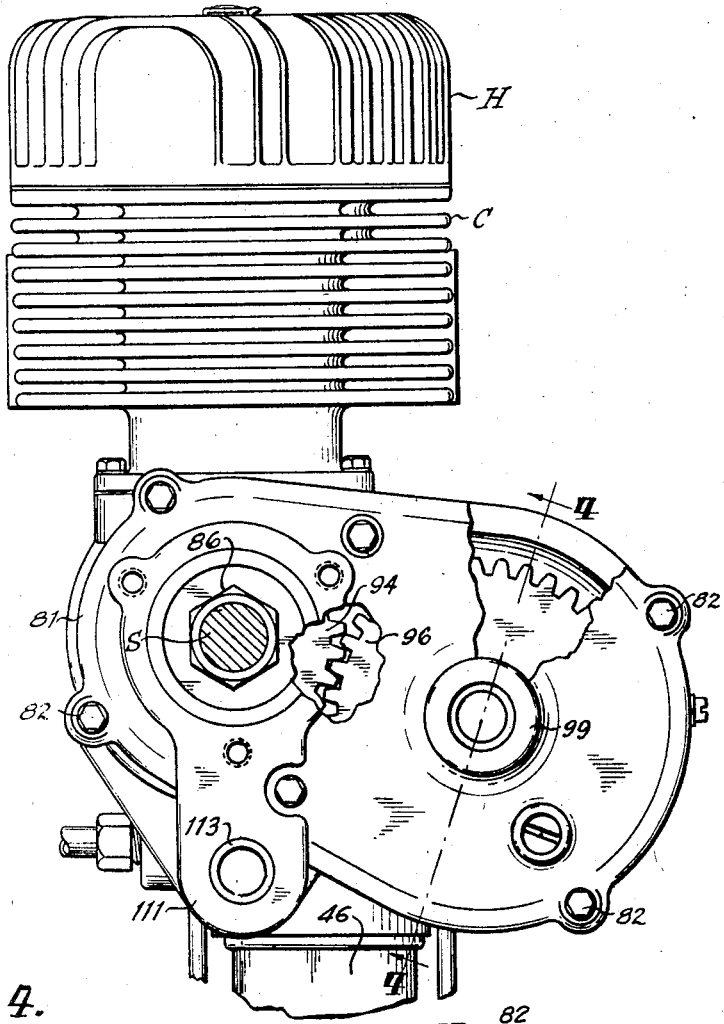
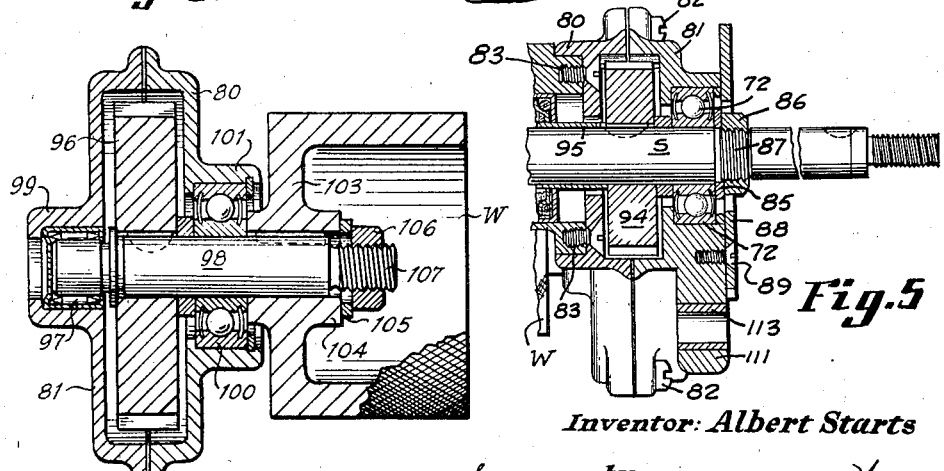
Inventor: Albert Starts United States Patent Office 2,888,838
Patented June 2, 1959

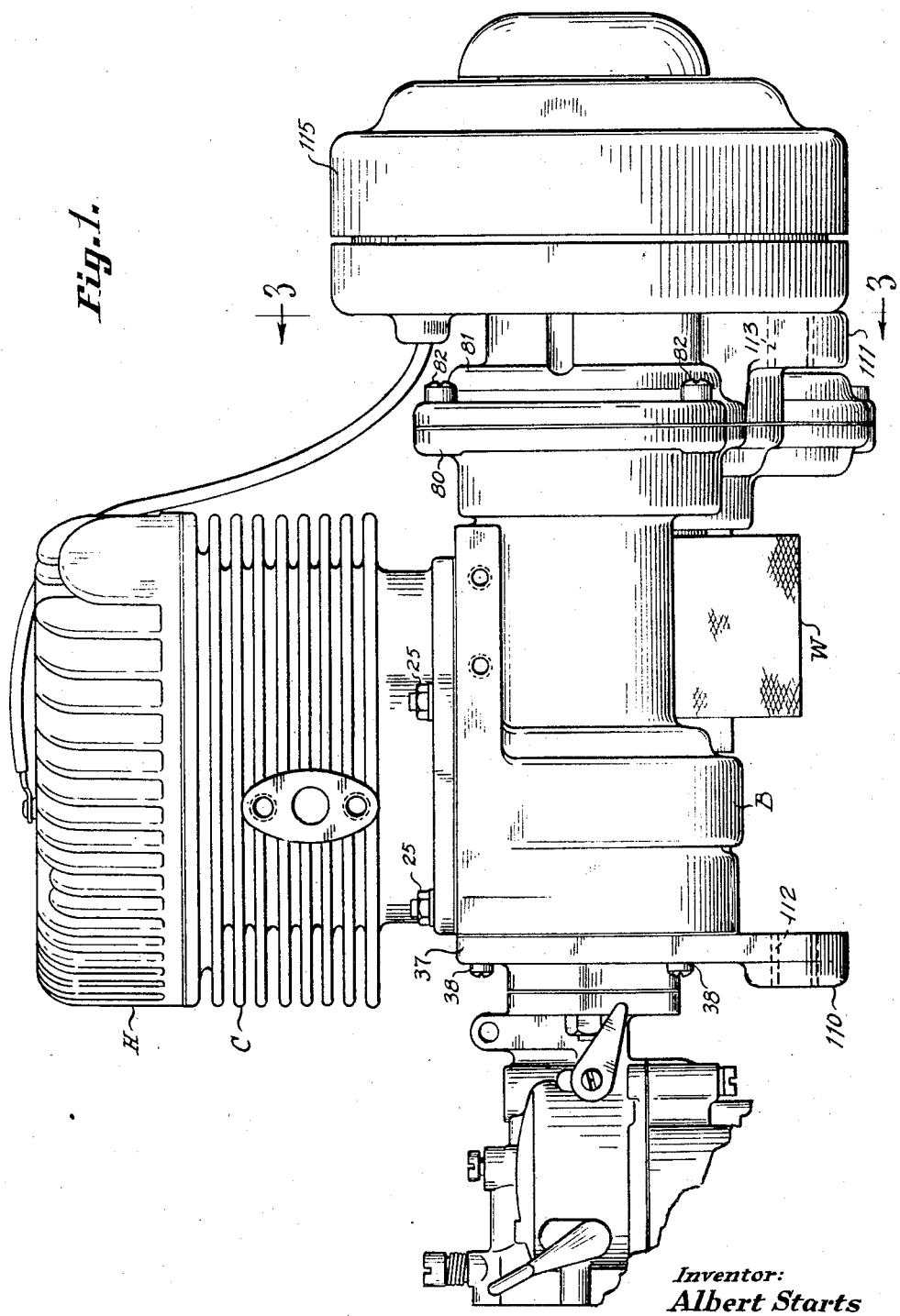

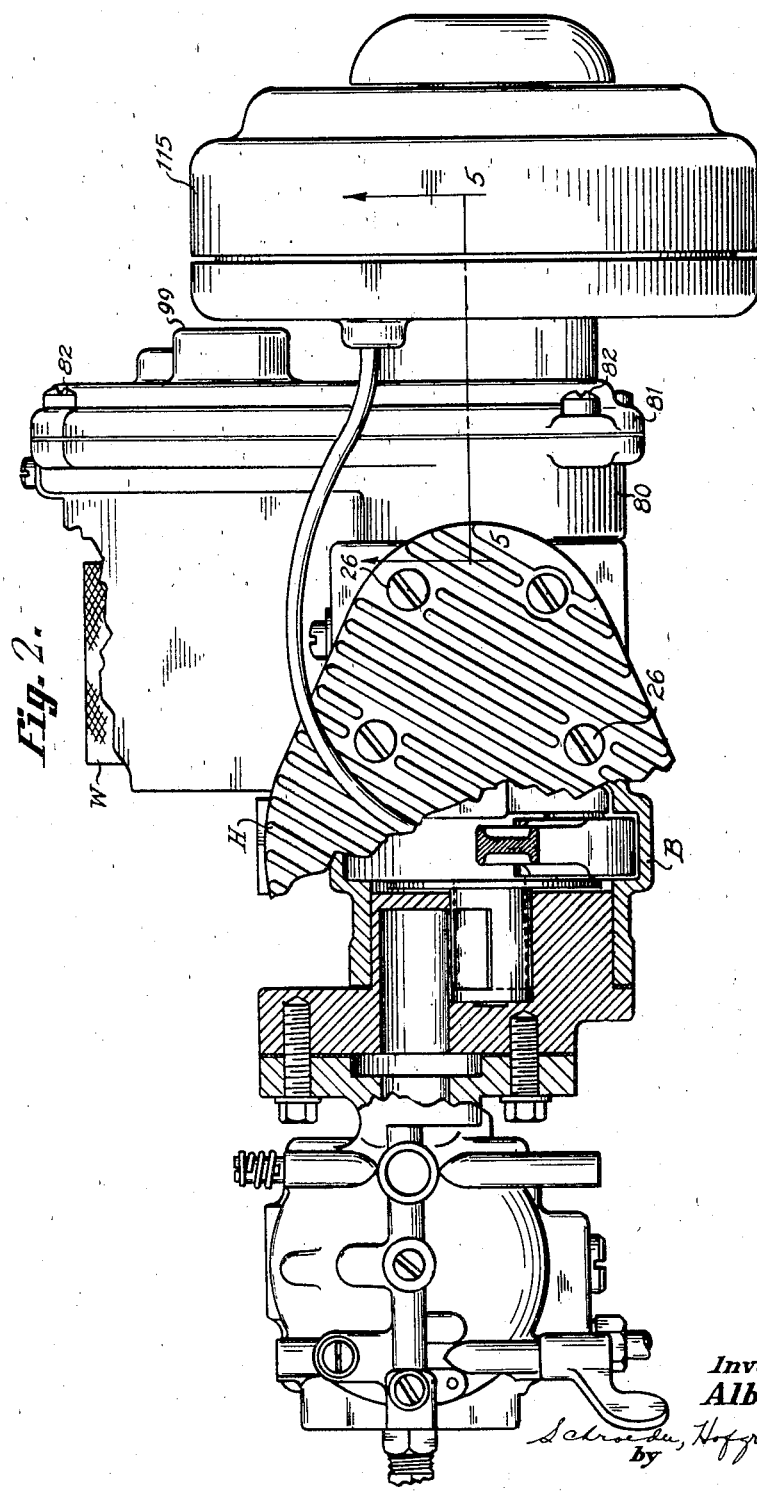

2,888,838

POWER TRANSMITTING APPARATUS

Albert Starts, Fort Lauderdale, Fla.

Original application January 4, 1951, Serial No. 204,294, now Patent No. 2,695,602, dated November 30, 1954. Divided and this application January 29, 1954, Serial No. 407,064

7 Claims. (Cl. 74—606)

This invention relates to a power transmitting apparatus for a power apparatus that includes a casing, a rotatable shaft therein and a driving member driven by the shaft and adapted to make driving contact with an object that is movable relative to this power apparatus.

This application is a division of my copending application Serial No. 204,294, filed January 4, 1951.

One of the features of this invention is the provision of such a power apparatus for this type of device and comprising a removable supporting member extending generally laterally of the shaft into which the shaft extends, the driving member being operatively held on the supporting member at a point spaced from the shaft, gearing mounted on the supporting member interconnecting the rotatable shaft and the driving member and a bearing structure for the shaft mounted on the supporting member and removable therewith.

Another feature of the invention is the provision of a power transmitting apparatus for an engine adapted to be mounted on a wheeled vehicle and including a pair of spaced depending arms on opposite sides of the center of gravity of the engine structure for rotatably mounting the same on the vehicle, a casing, a rotatable shaft therein and a driving member driven by the shaft and adapted to make driving contact with a wheel on the vehicle for propelling the vehicle. This power transmitting apparatus comprises a supporting member including a housing divided longitudinally into inner and outer parts enclosing a hollow space therebetween, the supporting member extending generally laterally of the shaft and forwardly of the engine with the shaft extending into said hollow space, a second shaft having one end extending into said hollow space at a point spaced from said first shaft, the other end of the second shaft carrying the driving member and being positioned generally forwardly of the space bounded by said supporting arms, a first gear in said hollow space mounted on the first shaft for rotation therewith, a second gear in said hollow space mounted on the second shaft and meshing with the first gear for rotation of the second shaft and thus the driving member, and a bearing for said first shaft positioned in said outer part of the housing outwardly of the first gear.

Other features and advantages of the invention will be apparent from the following description of one embodiment of the invention taken in conjunction with the accompanying drawings. Of the drawings:

Figure 1 is a fragmentary side elevational view of an internal combustion engine that includes one embodiment of the invention.

Figure 2 is a fragmentary plan view of the engine of Figure 1 partially in section and partially broken away for clarity of illustration.

Figure 3 is a sectional elevation partially broken away for clarity of illustration taken substantially along line 3—3 of Figure 1.

Figure 4 is a fragmentary elevational view taken substantially along line 4—4 of Figure 3.

Figure 5 is a fragmentary elevational view of the power transmitting apparatus taken substantially along line 5—5 of Figure 2.

The engine herein to be disclosed as an exemplification of my invention is designed particularly for application to a bicycle which it drives by means of a friction wheel or driving member which is arranged to engage the tread of the pneumatic tire of one of the two wheels of the bicycle, the engine being pivotally mounted so as to have capacity for rocking movement to advance its friction wheel toward or away from the tire tread, so as to engage therewith or disengage therefrom.

Referring first to Figs. 1 and 5, the engine embodies base or casing B forming a compression chamber $a$ comprising a crank case opening at one end upon a coaxial cam case of lesser diameter and on the other end to receive a closure cap which is secured to the base B as by bolts 38. Mounted on the base B is a cylinder C conventionally secured in place as by bolts 25, and open at its top end where a surmounting closure head H is affixed thereto by bolts 26.

The end of the base B opposite the closure cap 37 is open so that the shaft S may extend therethrough and outwardly therebeyond. To the open end of the base is secured a power transmitting apparatus including a hollow housing here shown as a gear casing comprising inboard and outboard sections or parts 80 and 81 interconnected as by bolts 82, the inboard section 80 being connected to the base by bolts 83. The anti-friction bearing unit 72 which supports the shaft S is accommodated within a seat provided interiorly of the outboard section 81 where it is secured in place by a plate 85 with the aid of a nut 86 that is screwed onto a threaded portion 87 of the shaft. An outer covering plate 88 is also carried by the outboard section 81 to which it is secured as by screws 89, thereby assuring retention of the inner plate 85 in place.

Mounted fast upon the shaft S within the chamber or hollow space provided by the two casing sections 80 and 81 is a first gear 94. A spacer sleeve 95 which surrounds the shaft S extends between this gear and the packing unit 75 and is maintained against rotation by any suitable means. The gear 94 is in mesh with a second gear 96 which is also accommodated within the same chamber in a lateral extension thereof (see Fig. 3). The gear 96 is mounted fast on a stub or second shaft 98 one end of which is supported rotatively in an antifriction bearing unit 97 that is mounted within a hollow boss 99 extended laterally from the outboard casing section 81. On the opposite side of the gear 96 a second antifriction bearing unit 100 is also provided for support thereof, this bearing unit being accommodated within a circular flange 101 that is extended laterally from the inboard casing section 80. The shaft 98 which is extended past the bearing unit 100 supports on its outer end portion a hollow friction wheel or driving member W open at one end and closed at its other end by a wall 103 which joins with a hub 104 that is secured fast to the shaft 98. As by means of a washer 105 and a nut 106 that is screwed onto threads 107 formed upon the shaft 98, the friction wheel W is retained securely in place.

Depending from the cap 37 is an ear or depending arm 110 opposite a similar ear or depending arm 111 which depends from the outboard casing section 81. Aligned openings in these ears are fitted with bushings 112 and 113, respectively, for reception of pivot pins (not shown) forming part of a mounting whereon the engine may be tiltably supported. Such a mounting may be advantageously used on a bicycle or other wheeled carrier which is to be powered by the engine herein disclosed. A magneto-flywheel 115 is carried by the shaft S outwardly of the bearing unit 72 and secured fixedly in place by any appropriate means.

The power transmitting apparatus specifically claimed herein has a number of new and unobvious advantages which give added strength, rigidity and economy of operation to the engine of this invention, while maintaining the total weight of the engine structure to a minimum and while reducing the overall cost of the engine structure. Thus, the supporting member, including the housing formed by the inner and outer parts 80 and 81, is preferably removable and serves to enclose and properly position the first and second gears, the bearing for the drive shaft and the second shaft upon which the driving member W is mounted. This housing extends laterally from the main body of the engine in order to provide clearance for the driving member or friction wheel. This permits locating the friction wheel in any desired position relative to the center of gravity of the engine. In the preferred structure the friction wheel is positioned forwardly of the space bounded by the depending mounting arms 110 and 111 and forwardly of the approximate center of gravity of the engine. This positioning of the friction wheel insures that a balanced downward force of the friction wheel on the tire or similar object is achieved. The positioning of the friction wheel forwardly of the mounting arms also serves to increase the leverage so as to magnify the weight effect of the engine on the friction wheel.

The two parts 80 and 81 of the housing permits completely enclosing the gearing and similar elements therebetween so as to prevent dirt and dust entering this gearing. It also serves to prevent the oil and grease from this gear contacting the vehicle or its rider.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. In an engine adapted to be mounted on a wheeled vehicle and include a pair of spaced depending arms on opposite sides of the center of gravity of the engine structure for rotatably mounting the same on said vehicle, a casing, a rotatable shaft therein and a driving member driven by the shaft and adapted to make driving contact with a wheel on said vehicle for propelling the same, power transmitting apparatus, comprising: a supporting member including a housing divided longitudinally into inner and outer parts enclosing a hollow space therebetween, the supporting member extending generally laterally of the shaft and forwardly of the engine with the shaft extending into said hollow space; a second shaft having one end extending into said hollow space at a point spaced from said first shaft, the other end of the second shaft carrying the driving member and being positioned generally forwardly of the space bounded by said supporting arms; a first gear in said hollow space mounted on the first shaft for rotation therewith; a second gear in said hollow space mounted on the second shaft and meshing with the first gear for rotation of the second shaft and thus the driving member; and a bearing for said first shaft positioned in said outer part of the housing outwardly of the first gear.

2. In a power apparatus including a mounting means, a casing, a rotatable shaft therein, a drive member driven by the shaft and adapted to make driving contact with an object movable relative to said power apparatus, power transmitting apparatus comprising: a removable supporting member extending generally laterally of said shaft, and into which the shaft extends, the driving member being operatively held on the supporting member at a point spaced from the shaft, gearing mounted on the supporting member interconnecting the rotatable shaft and the driving member, a bearing structure for the shaft mounted on the supporting member and removable therewith, said mounting means including a pair of spaced arms depending from the power apparatus and the driving member being located forwardly of the space bounded by said arm.

3. In an engine adapted to be mounted on a wheeled vehicle and including mounting means therefor, a casing, a rotatable shaft therein, and a drive member driven by the shaft and adapted to make driving contact with a wheel on said vehicle for propelling the same, power transmitting apparatus comprising: a removable supporting member extending generally laterally of the shaft and forwardly of the engine into which the shaft extends, the driving member being operatively held on the supporting member at a point spaced from the shaft and extending to a position generally forwardly of said mounting means and gearing mounted on the supporting member interconnecting the rotatable shaft and the driving member, said mounting means including a pair of spaced arms depending from the engine and the driving member being located forwardly of the space bounded by said arms.

4. In a power apparatus including a casing, a rotatable shaft therein and a driving member driven by the shaft and adapted to make driving contact with an object movable relative to said power apparatus, power transmitting apparatus, comprising: a supporting member readily removably mounted on said casing extending generally laterally of said shaft adjacent to one end only of said shaft and into which the shaft extends means for operatively holding the driving member on the supporting member at a point spaced from the shaft; gearing mounted on the supporting member interconnecting the rotatable shaft and the driving member; a bearing structure for the shaft mounted on the supporting member and removable therewith; and a mounting means for said power apparatus including an arm depending from the power apparatus, the driving member being located forwardly of said arm.

5. In an engine adapted to be mounted on a wheeled vehicle and including mounting means therefor, a casing, a rotatable shaft therein and a driving member driven by the shaft and adapted to make driving contact with a wheel on said vehicle for propelling the same, power transmitting apparatus, comprising: a supporting member extending generally laterally of the shaft adjacent to one end only of said shaft and extending to a point forwardly of the engine and into which the shaft extends, the driving member being operatively held on the supporting member adjacent to said forwardly extending point and spaced from the shaft; and gearing mounted on the supporting member interconnecting the rotatable shaft and the driving member, said mounting means including an arm depending from the engine, the driving member being located forwardly of said arm.

6. In an engine adapted to be mounted on a wheeled vehicle and including mounting means therefor, a casing, a rotatable shaft therein and a driving member driven by the shaft and adapted to make driving contact with a wheel on said vehicle for propelling the same, power transmitting apparatus, comprising: a supporting member extending generally laterally of the shaft and forwardly of the engine into which the shaft extends, the driving member being operatively held on the supporting member at a point spaced from the shaft and extending to a position generally forwardly of said mounting means; and gearing mounted on the supporting member interconnecting the rotatable shaft and the driving member, said mounting means including a pair of spaced arms depending from the engine, and the driving member is located forwardly of the space bounded by said arms.

7. In an engine adapted to be mounted on a wheeled vehicle and including mounting means therefor, a casing, a rotatable shaft therein and a driving member driven by the shaft and adapted to make driving contact with a wheel on said vehicle for propelling the same, power transmitting apparatus, comprising: a supporting member extending generally laterally of the shaft and forwardly of the engine into which the shaft extends, the driving member being operatively held on the supporting member at a point spaced from the shaft and extending to a position generally forwardly of said mounting means; and gearing mounted on the supporting member interconnecting the rotatable shaft and the driving member, said mounting means including a pair of spaced arms depending from the engine, and the driving member is located forwardly of the space bounded by said arms, and substantially aligned with the center of gravity of the engine structure.

References Cited in the file of this patent

UNITED STATES PATENTS

| | | |
|---|---|---|
| 2,031,881 | Evinrude | Feb. 25, 1936 |
| 2,036,389 | Bannan | Apr. 7, 1936 |

FOREIGN PATENTS

| | | |
|---|---|---|
| 988,144 | France | Apr. 25, 1931 |
| 104,445 | Austria | Nov. 17, 1924 |